United States Patent
Jones, Jr. et al.

(10) Patent No.: US 12,233,979 B2
(45) Date of Patent: Feb. 25, 2025

(54) REMOVABLE BASS SPEAKER ENCLOSURE FOR MOTORCYCLE SADDLEBAGS

(71) Applicant: Rockford Corporation, Tempe, AZ (US)

(72) Inventors: Richard Talfryne Jones, Jr., Phoenix, AZ (US); Richard James Agins, III, Phoenix, AZ (US); Bryce Edward Steidler, Phoenix, AZ (US); Brian Michael Von Pasecky, Queen Creek, AZ (US); Mark Allen Fisher, Casa Grande, AZ (US)

(73) Assignee: ROCKFORD CORPORATION, Tempe, AZ (US)

( * ) Notice: Subject to any disclaimer, the term of this patent is extended or adjusted under 35 U.S.C. 154(b) by 0 days.

(21) Appl. No.: 18/667,647

(22) Filed: May 17, 2024

(65) Prior Publication Data

US 2024/0383559 A1    Nov. 21, 2024

Related U.S. Application Data

(63) Continuation of application No. 17/481,749, filed on Sep. 22, 2021, now Pat. No. 11,987,314.

(51) Int. Cl.
*B62J 45/10*     (2020.01)
*B62J 9/26*      (2020.01)

(52) U.S. Cl.
CPC .................. *B62J 45/10* (2020.02); *B62J 9/26* (2020.02)

(58) Field of Classification Search
CPC .................... B62J 45/10; B62J 9/26
See application file for complete search history.

(56) References Cited

U.S. PATENT DOCUMENTS

| | | |
|---|---|---|
| D265,816 S | 8/1982 | Matre |
| D401,241 S | 11/1998 | Runquist et al. |
| D579,921 S | 11/2008 | Lazzeroni et al. |
| D601,931 S | 10/2009 | Files |
| D603,760 S | 11/2009 | Gregory |
| D615,908 S | 5/2010 | Ditterline |
| 8,139,810 B2 | 3/2012 | Armitage et al. |
| D675,113 S | 1/2013 | Droste et al. |
| 8,718,300 B1 | 5/2014 | Dixon |
| D729,129 S | 5/2015 | Hinsey et al. |
| D729,701 S | 5/2015 | Hinsey et al. |
| D764,355 S | 8/2016 | Hinsey et al. |
| D764,356 S | 8/2016 | Hinsey et al. |
| 10,112,671 B1 | 10/2018 | Yaffe |

(Continued)

OTHER PUBLICATIONS

HD14-SBSUB: The Ride, Reinvented. Retrieved from internet, https:// www.youtube.com/watchv=dGGcZ3heaHo&t=3s (2021).

(Continued)

*Primary Examiner* — Andrew Sniezek
(74) *Attorney, Agent, or Firm* — Snell & Wilmer L.L.P.

(57) ABSTRACT

A sealed speaker enclosure for a bass speaker that is hand-insertable and removable from a hard-side motorcycle saddlebag. The body of the enclosure complements the interior space of the saddlebag making sealing contact with the interior walls of the saddlebag. The bass speaker faces the motorcycle side of the saddlebag within the shock absorber tower indentation overlapping and opening. A speaker grill overlays the opening in the shock absorber tower indentation of the saddlebag.

20 Claims, 14 Drawing Sheets

(56) References Cited

U.S. PATENT DOCUMENTS

| | | |
|---|---|---|
| D847,889 S | 5/2019 | Gerber et al. |
| D870,601 S | 12/2019 | Klein et al. |
| 10,583,884 B2 | 3/2020 | Yaffe |
| D973,632 S | 12/2022 | Suzuki |
| 11,987,314 B2 * | 5/2024 | Jones, Jr. .................. B62J 9/23 |
| 2009/0296956 A1 | 12/2009 | Gregory |
| 2023/0041938 A1 | 2/2023 | Brashear et al. |

OTHER PUBLICATIONS

Rockford Fosgate HD14-SBSUB Dual 10_ Saddlebag Subwoofer. Retrieved from internet, https://www.amazon.com/Rockford-Fosgate-H D 14-SBSU B-Saddlebag-Motorcycles/dp/B08Q84GPK9 (2023).

* cited by examiner

REMOVABLE BASS SPEAKER ENCLOSURE FOR MOTORCYCLE SADDLEBAGS

1. CROSS-REFERENCE TO RELATED APPLICATION

This application is a continuation of U.S. application Ser. No. 17/481,749 filed Sep. 22, 2021, entitled "Removable Bass Speaker Enclosure for Motorcycle Saddlebags," which is hereby incorporated by reference for all purposes in its entirety.

BACKGROUND OF THE INVENTION

2. Field of the Invention

The present invention relates generally to improvements in sound production on motorcycles and, more particularly, pertains to new and improved bass speaker installations in a motorcycle saddlebag.

3. Description of the Related Art

In the field of motorcycle speaker system design, it has been the practice to place speakers in a variety of locations on a motorcycle. One of the most popular locations appears to be in a motorcycle saddlebag, and specifically, on the lid of a motorcycle saddlebag.

For example, U.S. Pat. No. 10,583,884, granted Mar. 10, 2020, for a saddlebag speaker assembly and method of forming a saddlebag speaker assembly, describes mounting a speaker on the lid of a hard-sided saddlebag. U.S. Pat. No. 10,112,671, granted Oct. 30, 2018, similarly describes specific placement of a speaker in the lid of the saddlebag.

A patent for a motorcycle media system, U.S. Pat. No. 8,718,300, mounts speakers on a rearview mirror or a crash bar, in a saddlebag or on the handlebar. The patent describes the mounting of a subwoofer to the top wall of an enclosed domed housing located behind a rider of a motorcycle.

U.S. Pat. No. 8,139,810, granted Mar. 20, 2012 for a motorcycle speaker system, describes mounting speakers on a trunk of a motorcycle, behind the rider.

Published Patent Application No. US 2009/0296956, published Dec. 3, 2009 for a motorcycle speaker assembly, describes mounting speakers on a lid of a hard-side saddlebag for a motorcycle.

These prior art speaker systems recognize the harsh environment to which sound systems on motorcycles are exposed to. A rider's ability to hear the sounds from a system is hampered by wind, road and engine noise. Moreover, speaker-mounting opportunities on a motorcycle are limited as to location and as to speaker size.

The prior art attempts to mount speakers in hard-sided saddlebags resulted in speakers in the lid of or in the front end of the saddlebag. The sound generated is therefore either directed straight up or forward. Because of the limited size of the lid, the size of the speaker is also limited. This results in a system that does not effectively reproduce most of the audible range of human hearing, 20 Hz to 20K Hz. The lower frequencies in that range produce the richness of sound desired. This requires a large speaker, a woofer or a subwoofer. Depending on the low frequency range being produced, the size of the woofer, or bass speaker, becomes problematically large. Furthermore, a powered bass speaker in the low frequency range causes vibrations at its mounting and surroundings, adding to deterioration of performance caused by wind, road and engine noise.

To provide for a more desirable-sounding speaker system for motorcycles, low frequency production is essential. The present invention provides a heretofore unavailable improvement in low frequency audio production for a motorcycle without undo modification of the motorcycle.

SUMMARY OF THE INVENTION

A bass speaker enclosure designed for complementary fit within a motorcycle saddlebag. The speaker enclosure is hand-removable from the saddlebag, allowing use of the full volume of the saddlebag. A surround of the bass driver diaphragm seals to an inside wall of the saddlebag around an opening in the wall that is covered by a speaker grill. The speaker grill fits within a shock absorber tower indentation on the saddlebag. The size and placement of the grill allows for the maximum air pressure generated by the bass driver to exit the saddlebag. Placement of the grill allows any liquid accumulated in the saddlebag to drain out through the lower edge of the screen. A removable bass speaker enclosure together with the saddlebag walls form a sound chamber for the bass driver, resulting in a more powerful and precise sound. The bass speaker enclosure may provide a cavity in its top sized to accommodate a lid-mounted speaker. The top speaker cavity forms an enclosure that isolates the lid-mounted speaker from the sound pressure produced by the bass speaker.

BRIEF DESCRIPTION OF THE DRAWINGS

The objects and features of the invention and its many advantages will be readily appreciated as the same becomes better understood by reference to the following detailed description when considered in conjunction with the accompanying drawings in which like-referenced numerals designate like-parts throughout the figures thereof and wherein.

DETAILED DESCRIPTION OF THE INVENTION

Figure 1:
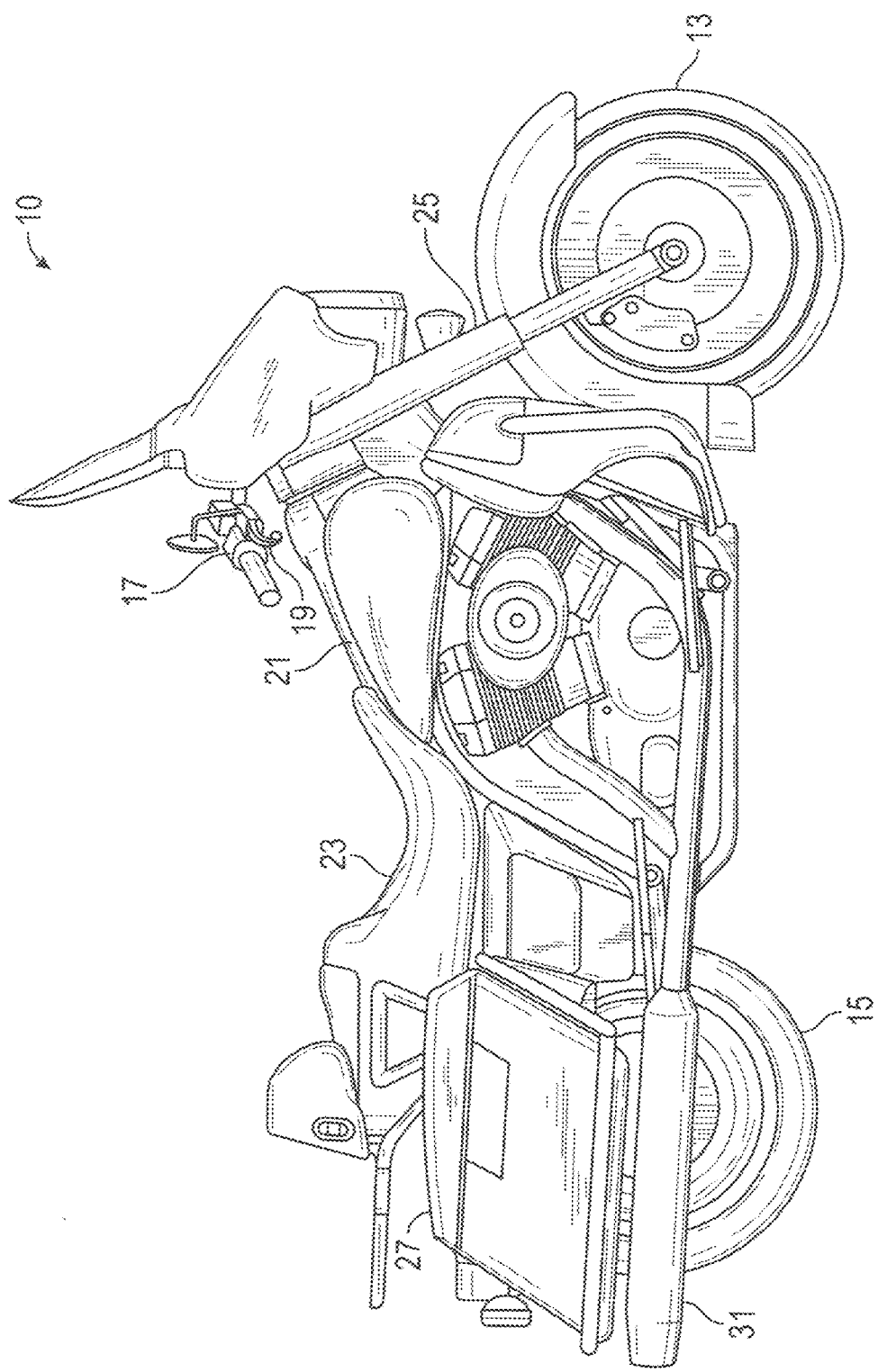
FIG. 1 is a pictorial representation of a motorcycle with hard-side saddlebags.

FIG. 1 illustrates a typical motorcycle for which the present invention is adapted. The motorcycle 10 is equipped with a front wheel 13 and a back wheel 15, front shock absorbers 25, rear shock absorbers (not shown), handlebar 17 and brake lever 19 on one side of the handlebar. A clutch lever (not shown) is located on the other side of the handlebar. The motorcycle has a gas tank 21 with a seat 23 for the driver immediately behind. An exhaust muffler 31 extends along the back wheel and beyond. A hard-side saddlebag 27 is mounted to the motorcycle 10 as is well-known in the art.

Figure 2:
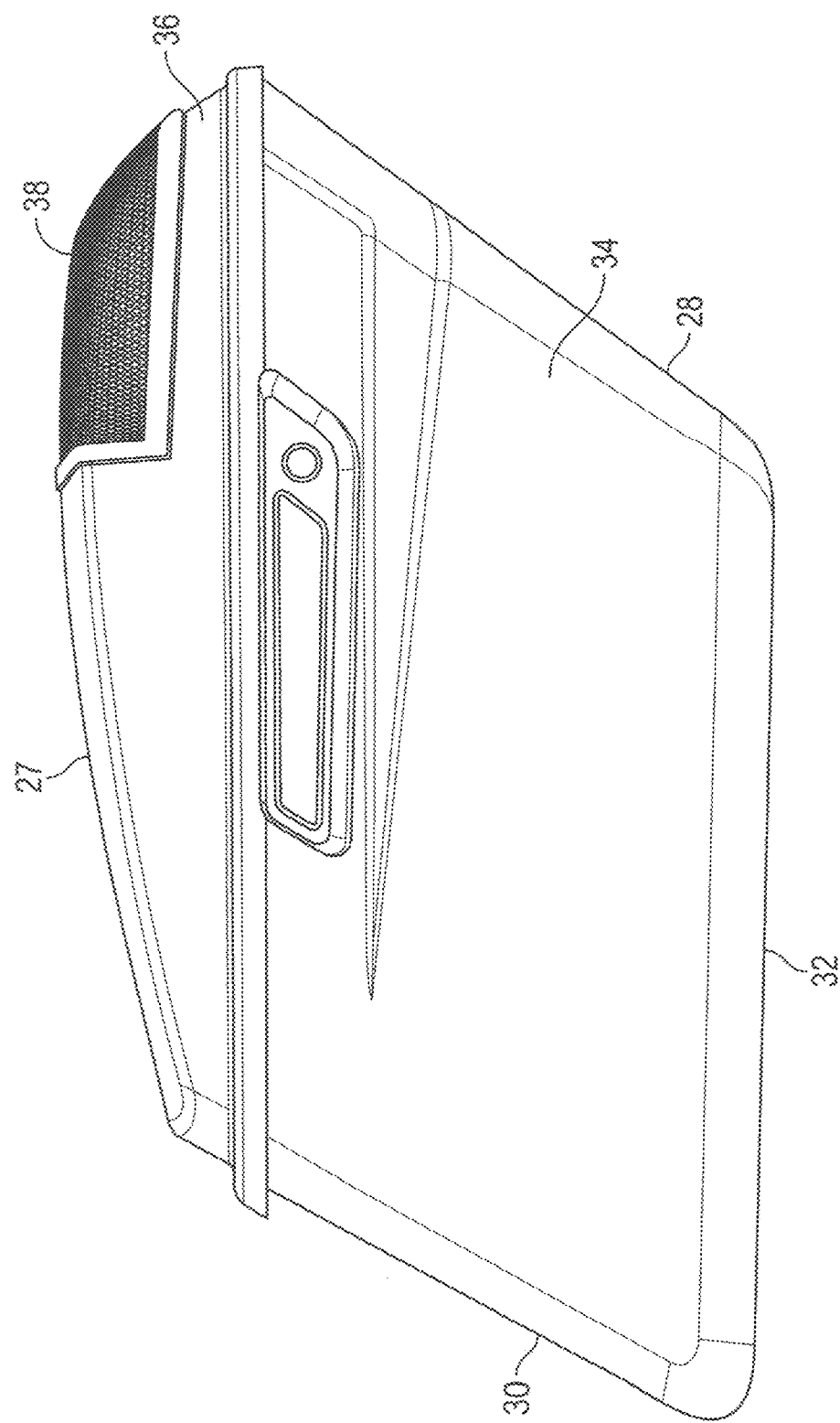
FIG. 2 is an elevation view of the front side of a saddlebag that may be used on the motorcycle of FIG. 1.

FIG. 2 illustrates the front side 34 of the saddlebag 27, which is mounted on the brake side of the motorcycle 10. A second saddlebag of similar construction (not shown) is mounted on the clutch side of the motorcycle. The lid 36 of the saddlebag has a speaker grill 38 mounted thereon with a speaker (not shown) mounted to the inside of the lid. The front end 28 of the saddlebag is slanted, as is the back end 30. A fixed bottom 32 is opposite a hinged top. The top swings open allowing access to the saddlebag.

Figure 3:
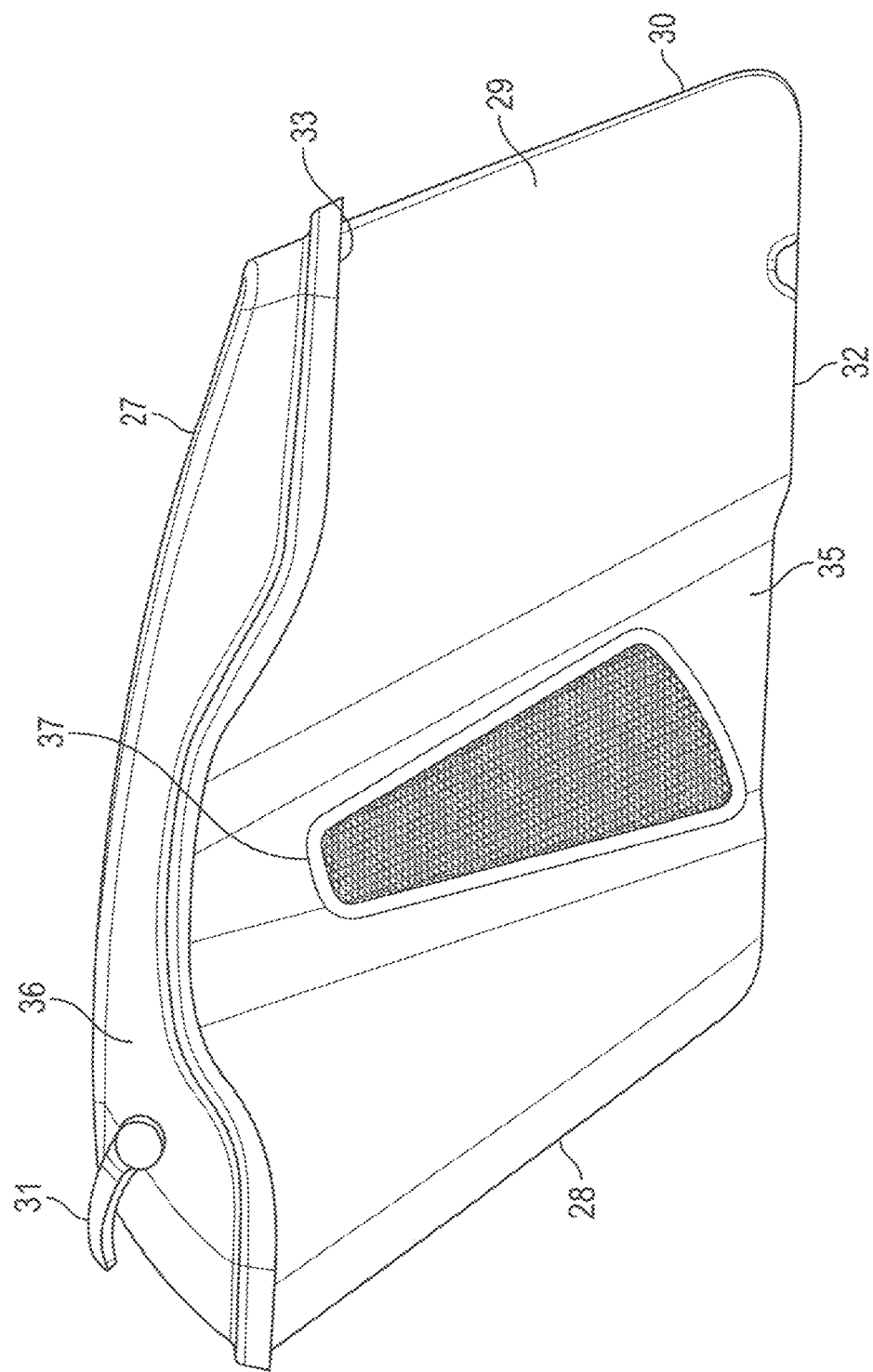
FIG. 3 is an elevation view of the back side of the saddlebag of FIG. 2.

FIG. 3 illustrates the back side 29 of the saddlebag 27 with the back end 30, front end 28 and bottom 32. The hinged top 36 of the saddlebag latches and locks to the main body of the saddlebag. A latch (not shown) is engaged by a lever 31. The back side 29 of saddlebag 27 has a shock absorber tower indentation 35. The indentation in the back side 29 of the saddlebag provides a space for the rear shock absorber. A speaker grill 37, defining an opening in the back side 29 of saddlebag 27, is mounted within indentation 35.

The saddlebag 10, as illustrated in FIGS. 2 and 3, is structured so that when the lid 36 is closed in sealing engagement to the body of the saddlebag 27, the interior space acts as a sealed speaker enclosure or an acoustic suspension enclosure. Mounting a large bass speaker on the inside of the saddlebag at the location of the speaker grille 37 in the shock absorber tower indentation 35 would produce superior low frequency sounds. However, because of the required size of the bass speaker, the storage of the saddlebag would be severely compromised and become useless. To the contrary, the present invention provides superior low frequency sound when in the saddlebag and does not impair the storage space in the saddlebag when removed from the saddlebag.

Figure 4:
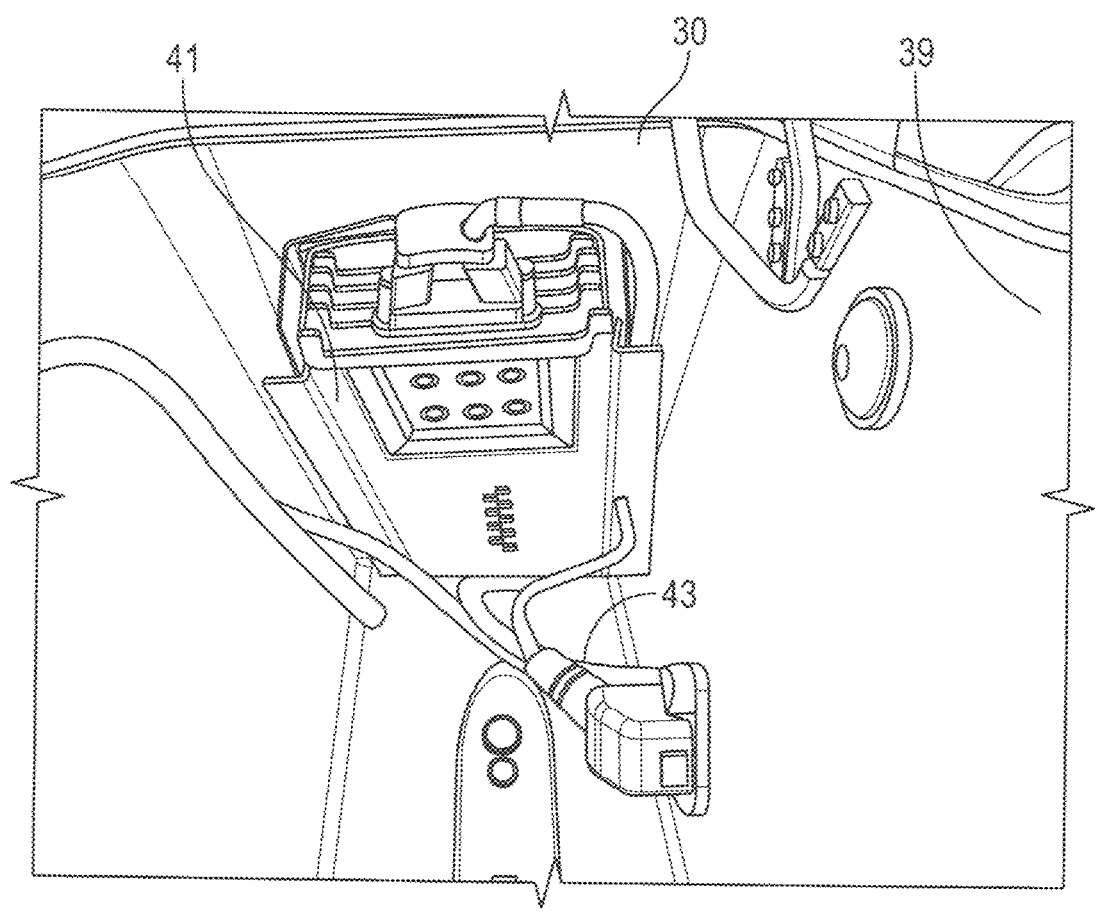
FIG. 4 is a perspective view of a back portion of the interior of the saddlebag of FIGS. 2 and 3.

FIG. 4 illustrates the back end 30 of the interior 39 of the saddlebag. An amplifier 41, with cables 43 routed close to the interior walls of the saddlebag, is mounted in this back end area. The amplifier 41 drives the bass speakers mounted in the brake side and clutch side saddlebags.

Figure 5:
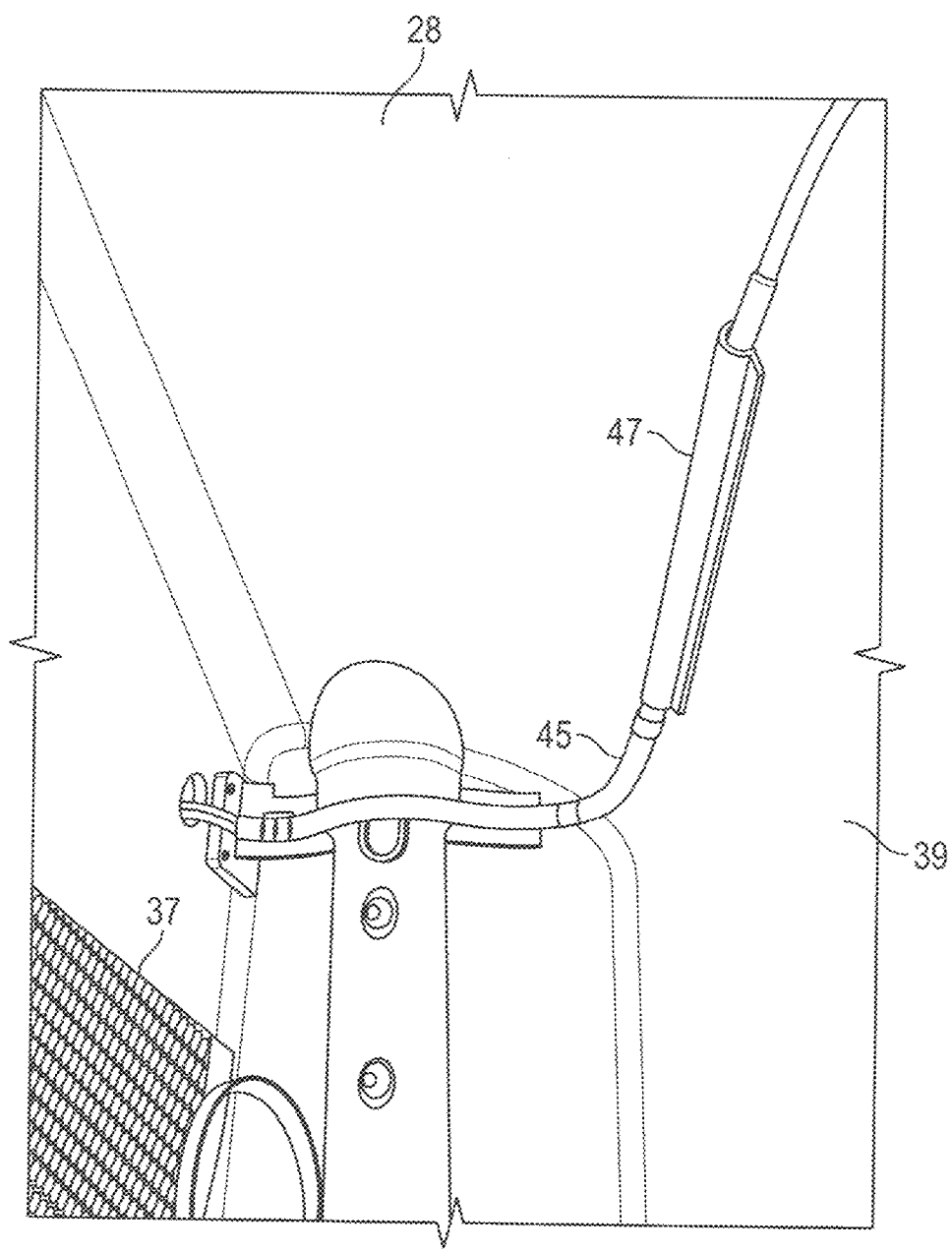
FIG. 5 is a perspective view of a front portion of the interior of the saddlebag of FIGS. 2 and 3.

FIG. 5 illustrates the front end 28 of the interior 39 of the saddlebag. Cables 45 are routed along the bottom 32 and the sides within a cable sleeve 47, occupying the least amount of space in the interior of the saddlebag. A speaker grille 37 is mounted on the back side of the saddlebag.

Figure 6:
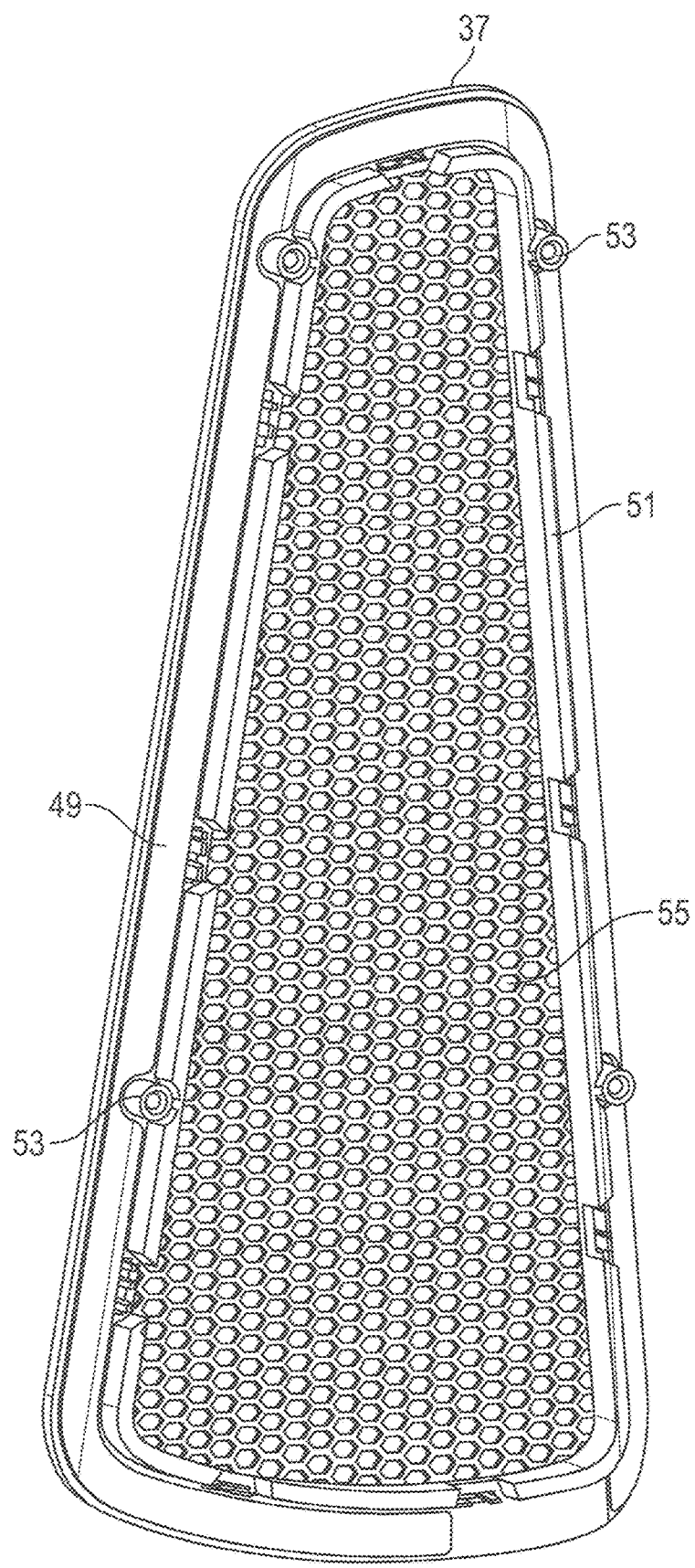
FIG. 6 is an elevation view of the back side of a speaker grille that may be used on the saddlebag of FIGS. 2 and 3.

The speaker grille 37 of FIG. 6 is uniquely shaped to fit within the shock absorber tower indentation of the saddlebag, being narrow on top and wider at the bottom. A flat perimeter 49 surrounds the outside of the grille structure 55. The perimeter carries a plurality of threaded through-holes 53 for receiving bolts. A wall 51 surrounds the perimeter of the screen 55.

Figure 7:
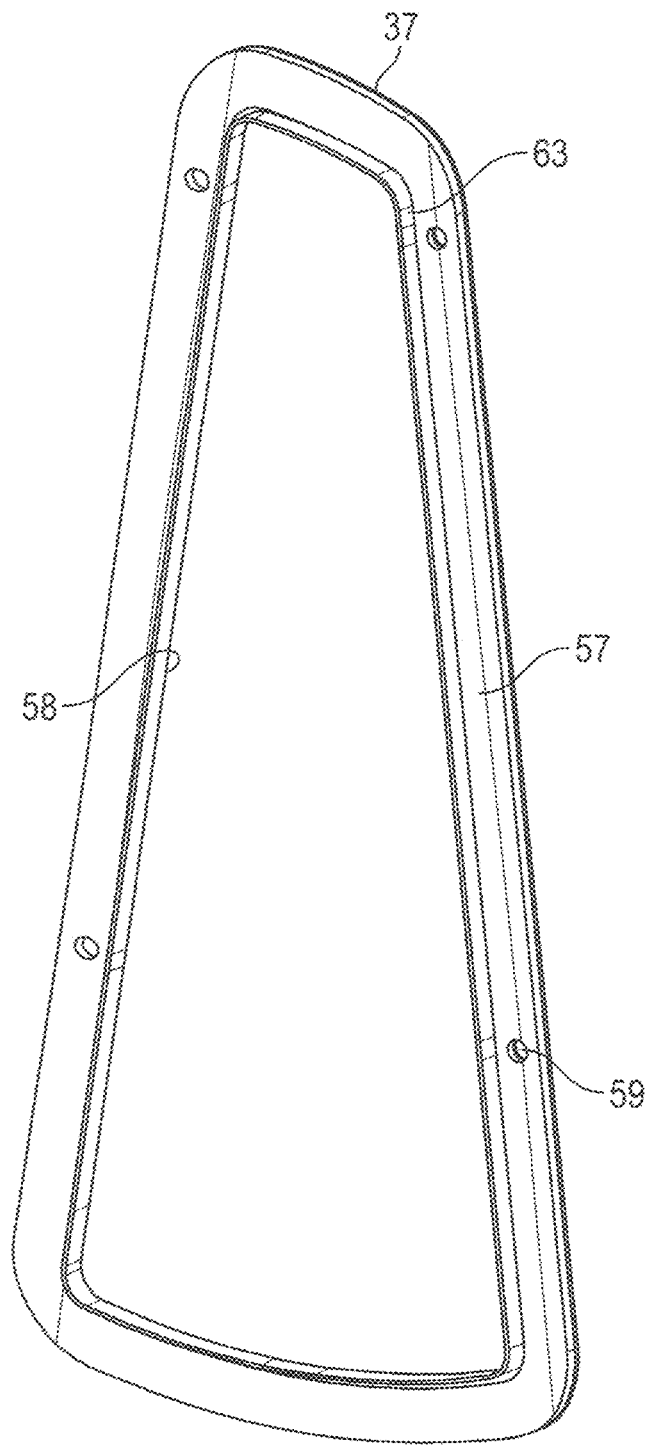
FIG. 7 is an elevation view of a back plate for the speaker grille of FIG. 6.

FIG. 7 illustrates a back plate for use with the speaker grille 37. The back plate has matching screw through-holes 59 and a flat surround 57, which matches the flat surround 49 of the front plate in FIG. 6. A wall 63 runs along the opening in the back plate. The wall 63 fits within wall 51 of the front plate of FIG. 6.

Figure 8:
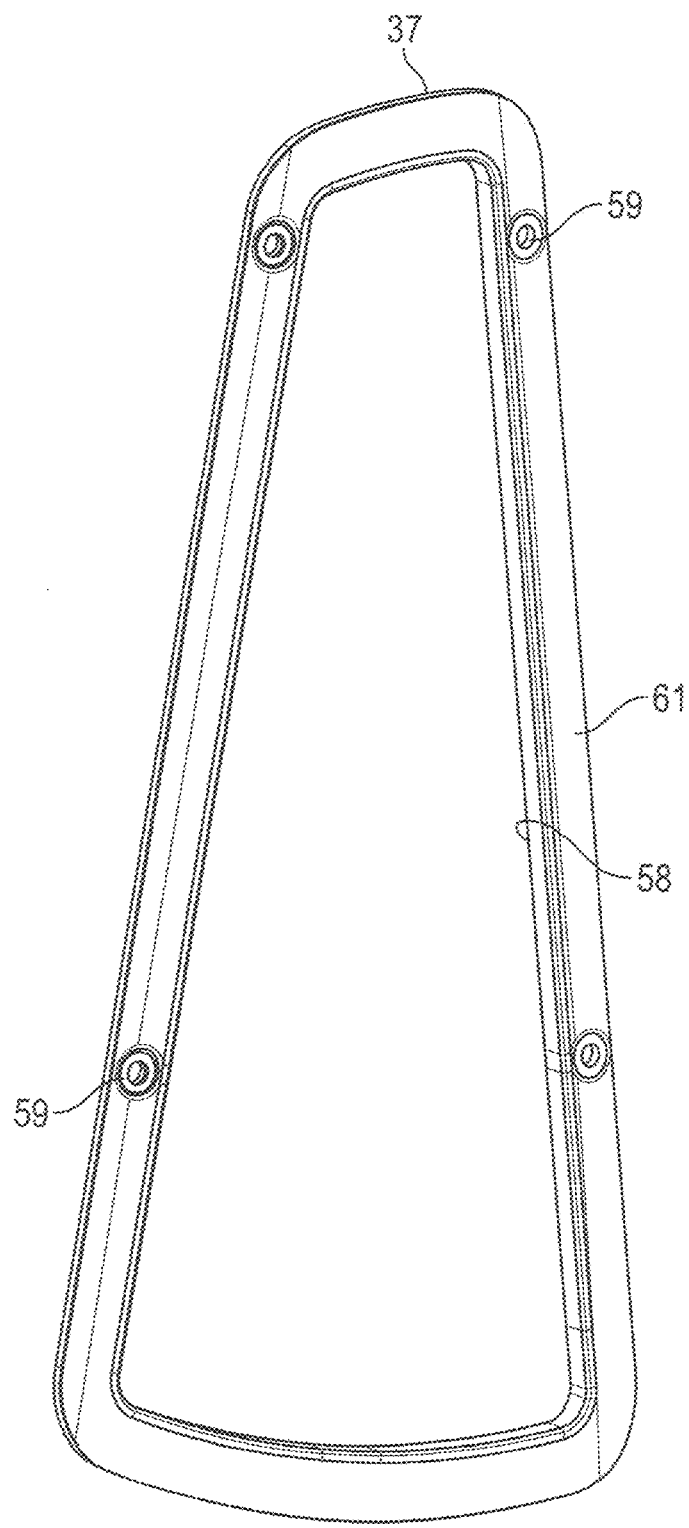
FIG. 8 is an elevation view of the back side of a back plate of FIG. 7.

FIG. 8 shows the back side of the back plate 37 of FIG. 7, with through-holes 59. The speaker grill is assembled to the saddlebag by attaching the back plate of FIGS. 7 and 8 to the inside wall of the saddlebag around an aperture shaped like the aperture 58 in the back plate of FIGS. 7 and 8. The front side of the grill 37 as shown in FIG. 6 is placed on the outside of the saddlebag in the shock absorber tower indentation to mate with the back plate. Screws are passed through the back plate to the front plate and thread into threaded apertures 53 of the front plate shown in FIG. 6.

Figure 9:
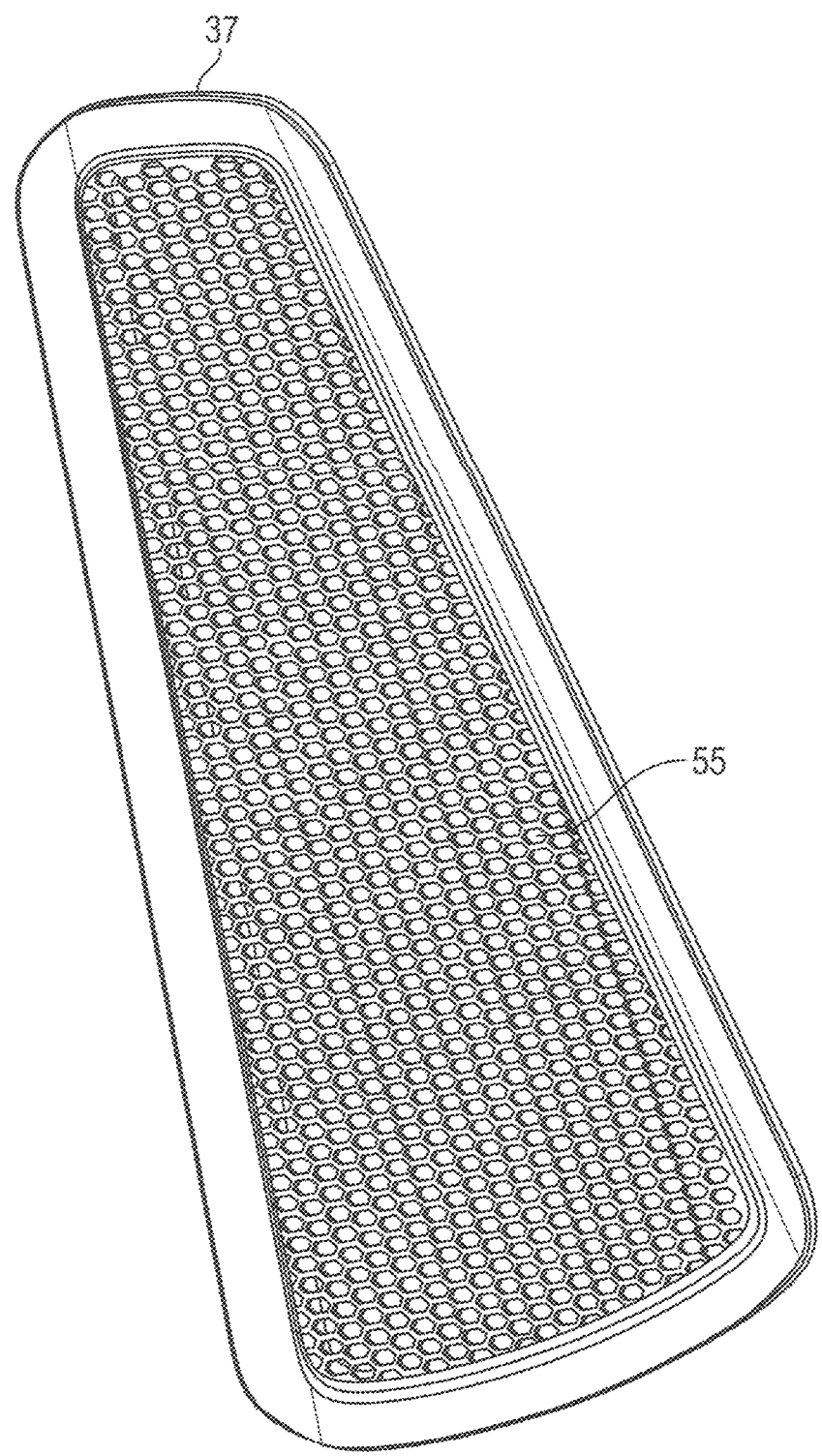
FIG. 9 is a front perspective of a speaker grille that may be used in the saddlebags of FIGS. 2 and 3.

FIG. 9 illustrates the assembled speaker grill 37 mounted over an aperture (not shown) in the shock absorber tower indentation on the back side wall of the saddlebag.

To provide the dual goals of a high-performing bass speaker for a motorcycle without permanently impairing the carrying capacity of a motorcycle saddlebag, an easily-removable bass driver enclosure shaped to fit the interior space of a saddlebag has been created.

Dynamic speaker drivers designed for producing the low and very low frequencies in the human audible range require a large driver diameter and separate amplifiers to produce the low end of the audible frequency spectrum. To obtain the best sound from these low frequency drivers or woofers, a sealed speaker enclosure or acoustic suspension enclosure is highly desirable. Such an enclosure produces better sound from a bass speaker. The material of the enclosure is designed to absorb the vibrations generated by the bass speaker. Making the enclosure self-contained, facilitates movement of the enclosure into and out of a saddlebag. The sound produced by a bass speaker enclosure is tighter and more precise than a bass speaker not mounted in such a sealed enclosure.

Figure 10:
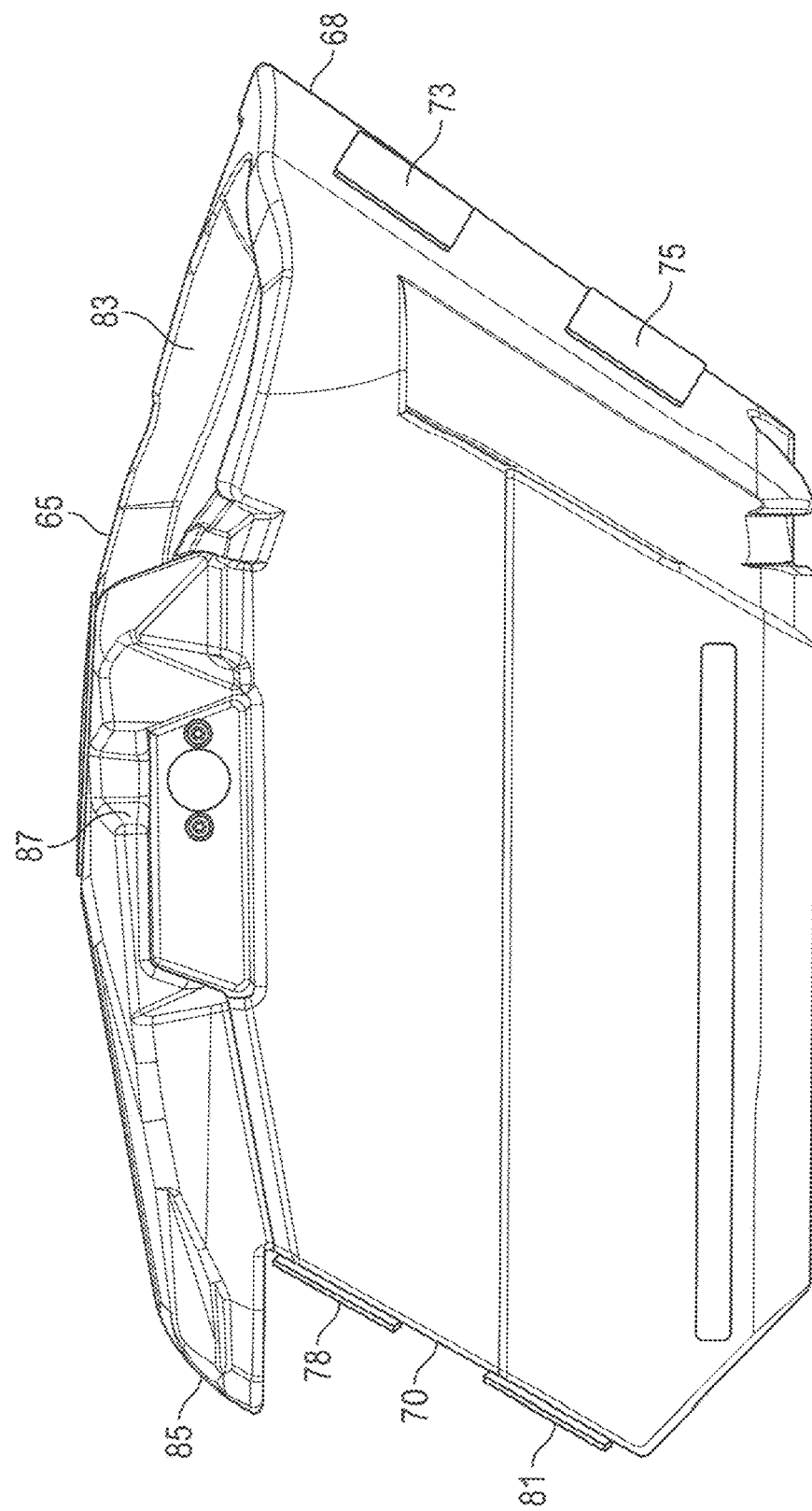
FIG. 10 is a front side elevation of a bass speaker enclosure.

The bass speaker enclosure 65 of the present invention, as illustrated in FIG. 10, has a shape that conforms with the interior space of the saddlebag shown in FIGS. 2 and 3. The saddlebag mounted on the other side of the motorcycle (not shown) will have similar construction as will the speaker enclosure in conforming to the interior space. The sealed bass speaker enclosure 65 has a front end 68 with pads 73 and 75 mounted thereon and a back end 70 with pads 78 and 81 mounted thereon. The pads as well as the shape of the enclosure ensure a fit that prevents vibration caused by the bass speaker. The top of sealed enclosure 65 has a cavity 83 therein for providing space for a speaker mounted in the lid of the saddlebag. An opening 87 in the top of the sealed enclosure provides for hand insertion and gripping of the enclosure 65 during insertion into and removal from the saddlebag.

Figure 11:
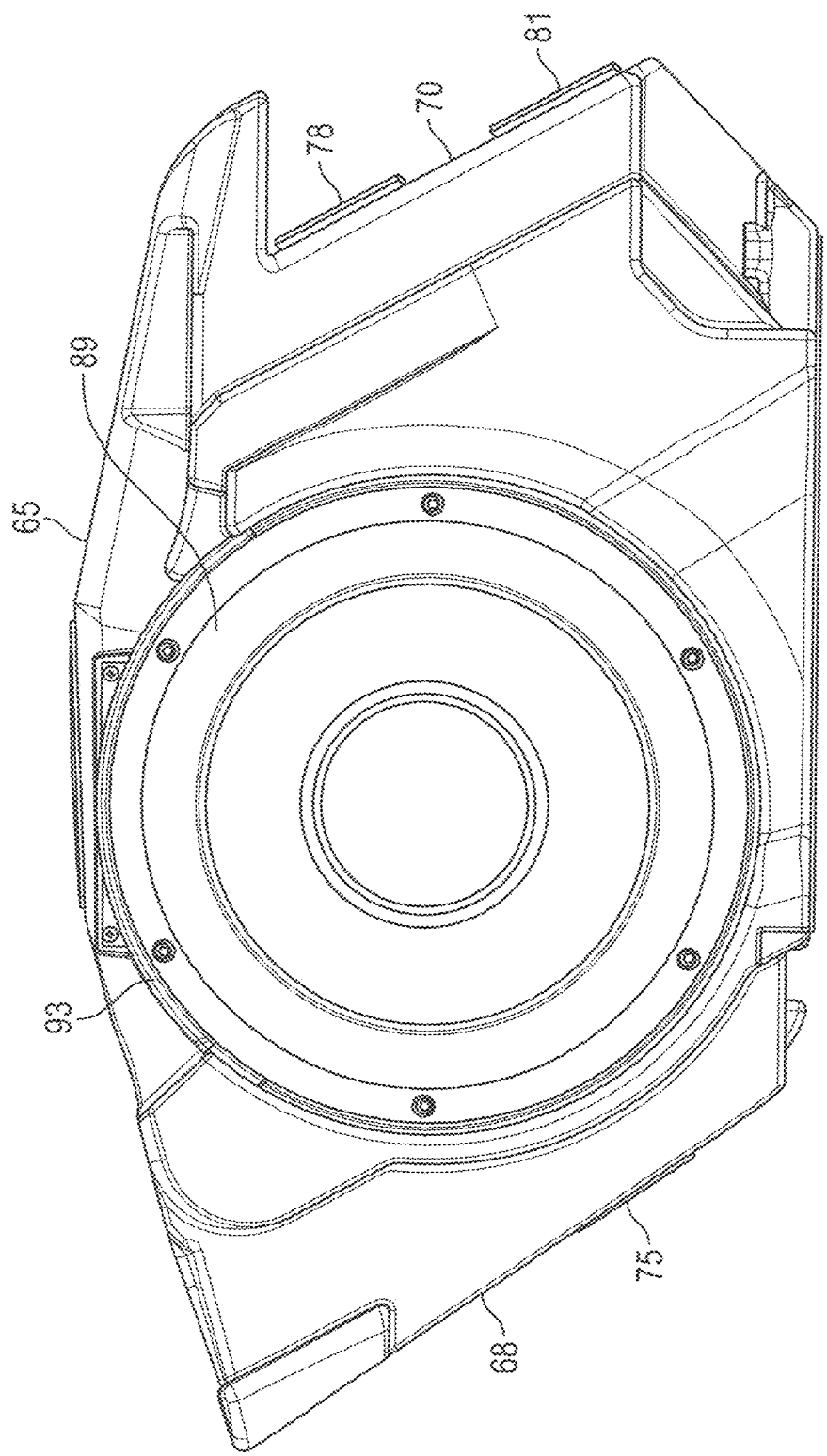
FIG. 11 is a back side elevation of a bass speaker enclosure of FIG. 10.

FIG. 11 illustrates the back side of the sealed enclosure 65 of FIG. 10. A bass speaker 89 is mounted therein. The bass speaker has a surround with a sealing gasket 93 therearound for making sealing contact with the inside wall of the saddlebag around the speaker grille.

Figure 12:
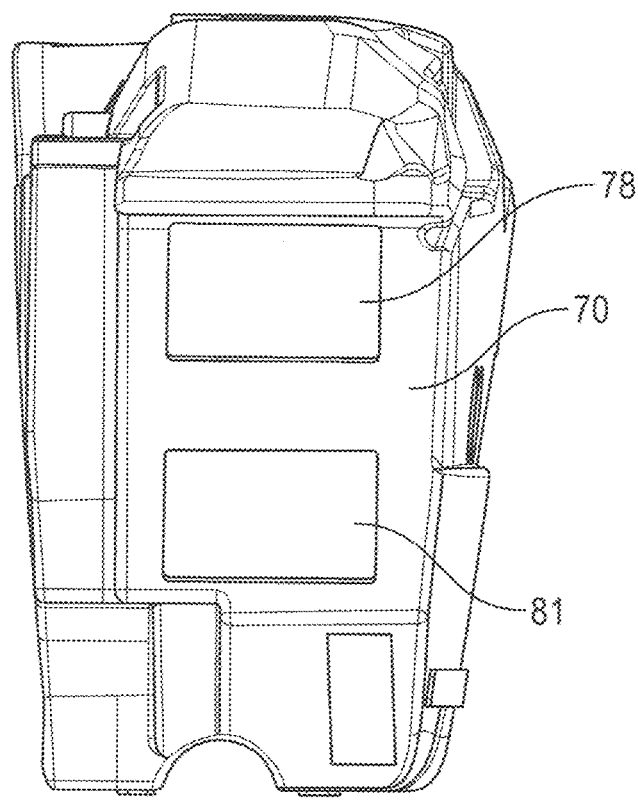
FIG. 12 is a left end elevation view of the speaker enclosure of FIG. 10.

FIG. 12 illustrates the back end 70 of the bass speaker enclosure with pads 78 and 81 mounted thereon for contact with the interior end surface of the saddlebag.

Figure 13:
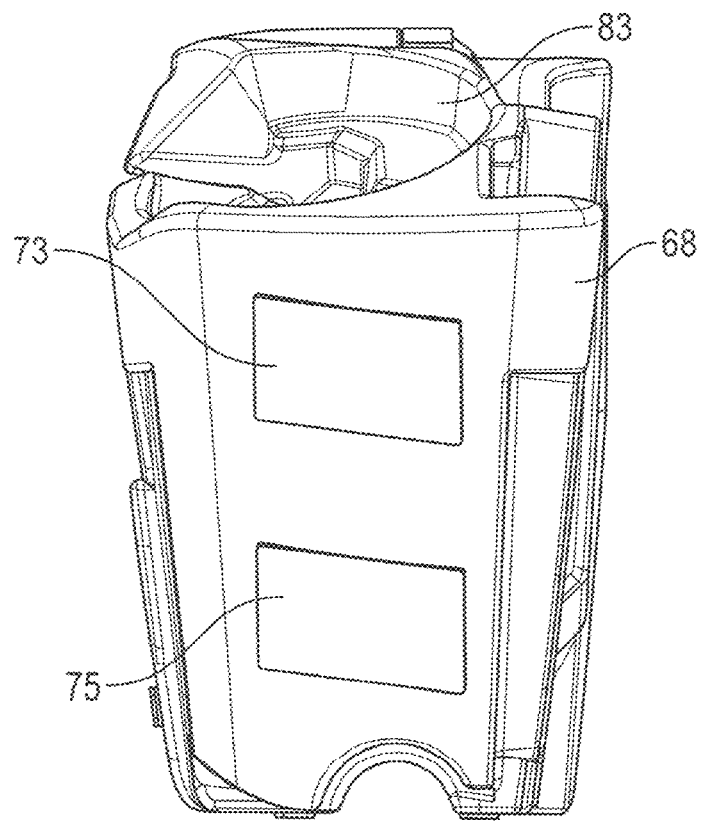
FIG. 13 is a right end elevation view of the speaker enclosure of FIG. 10.

FIG. 13 illustrates the front end 68 of the bass speaker enclosure with pads 73 and 75 adapted to make contact with the front interior wall of the saddlebag. A custom-formed cavity 83 located in the top of the sealed enclosure 65 to allow for a speaker mounted in the lid 36 of the saddlebag.

The bass speaker enclosure illustrated in FIGS. 10-13 is sized and shaped to be within 2 mm of the interior walls of the saddlebag within which it is located.

Figure 14:
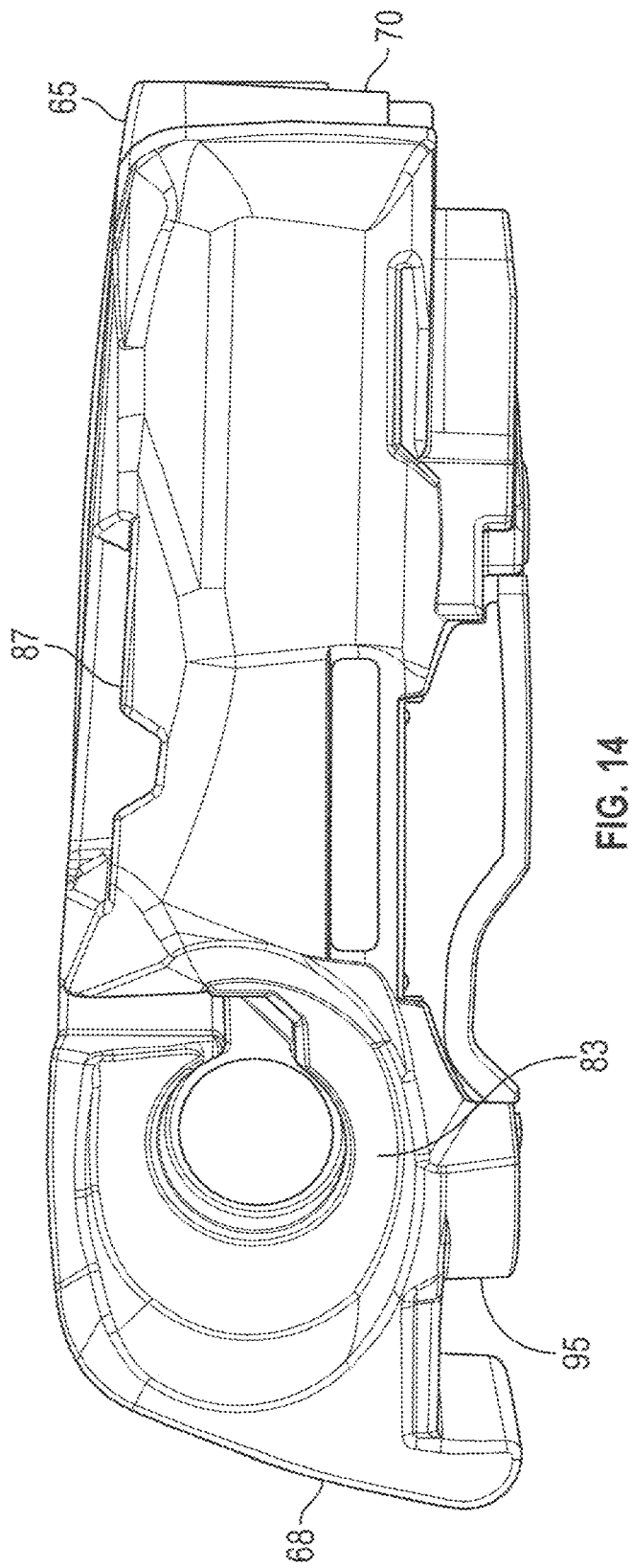
FIG. 14 is a top plan view of the speaker enclosure of FIG. 10.

FIG. 14 illustrates the top view of the sealed bass speaker enclosure 65 showing the cavity 83 provided for a speaker mounted in the lid of the saddlebag. Cavity 83 is shown located towards the front end 68 of the bass speaker enclosure but can be located anywhere along its length, depending upon where the speaker is mounted on the lid. Towards the front of the saddlebag and closer to the rider is the most desirable location. A channel 95 is located in the side of the speaker enclosure to allow for a latching mechanism between the lid and the body of the saddlebag and for routing wires.

Figure 15:
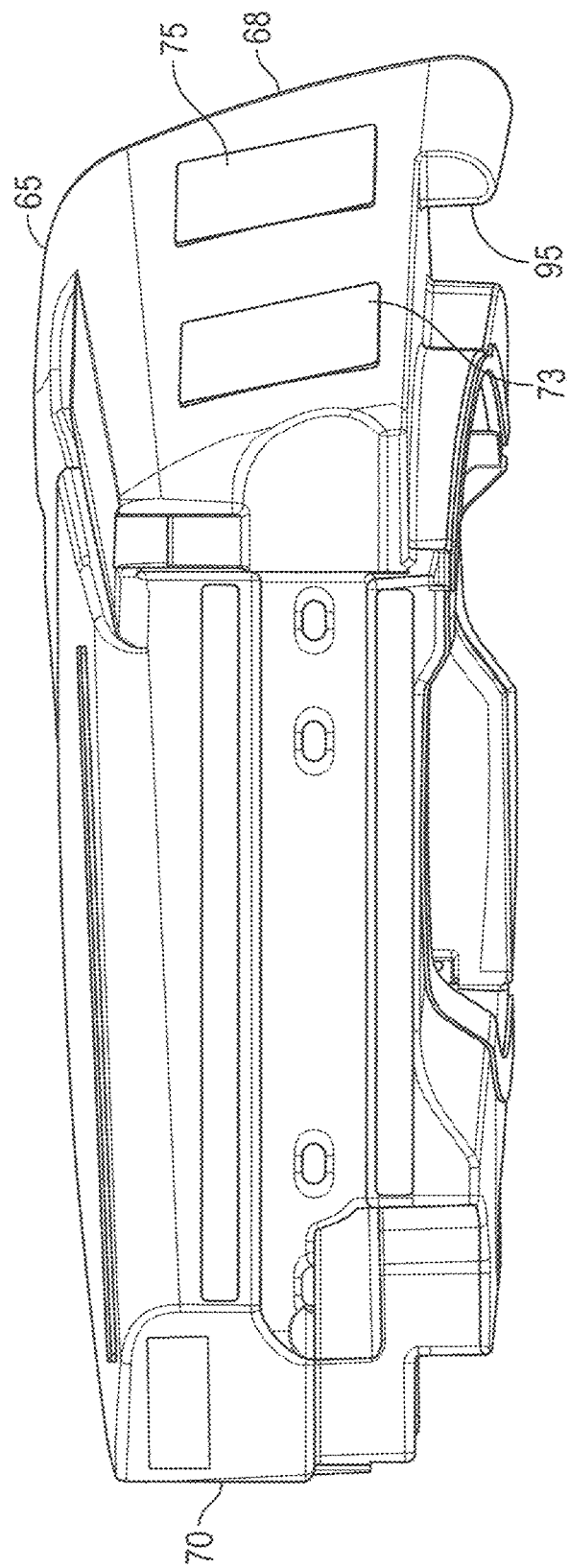
FIG. 15 is a bottom plan view of the speaker enclosure of FIG. 10.

FIG. 15 shows the bottom of the sealed speaker enclosure of FIG. 16 with the pads 73 and 75 mounted at the front and a channel 95.

Once the sealed speaker enclosure for the bass driver is inserted into the saddlebag, the fit between the walls of the speaker enclosure and the internal walls of the saddlebag act like the walls of an acoustic suspension enclosure. Because of this surprising phenomena, in spite of the acoustic force generated by the bass speaker, there are no interfering vibrations and the driver stays where it is supposed to be, resulting in a sound that is powerful, tighter and more precise. The vibrations created by the bass speaker are absorbed rather than drowning out the sound produced by the speaker.

The location of the speaker grill on the back side of the saddlebag, as shown in FIG. 3, has two advantages. It allows for any liquid that may inadvertently accumulate in the saddlebag to drain out of the bottom corner of the speaker grill 37, and the size of the opening allowable in the shock absorber tower indentation of the saddlebag permits maximum sound transfer from the enclosure.

Besides providing for exceptional sound reproduction in a low frequency range, the structure of the present invention provides for ease of removal and insertion of the bass speaker enclosure. Only one electrical disconnection is required.

It should be understood, of course, that the foregoing disclosure relates only to preferred embodiments of the invention and that modifications may be made therein without departing from the spirit and scope of the invention as set forth in the appended claims.

What is claimed is:

1. A speaker assembly for mounting on a motorcycle, the motorcycle comprising: a saddlebag having an interior space defined by a lid, a front side, a back side, a front end, a back end and a bottom, the saddlebag adapted for connection to a rear end of the motorcycle, the saddlebag having an opening; and a speaker grill mounted over the opening, the speaker assembly comprising:
   a speaker enclosure, complementary in shape to the interior space of the saddlebag, having a bass speaker mounted in a first cavity therein, the speaker enclosure further comprising a bass speaker surround, wherein the bass speaker aligns with the opening when the speaker enclosure is inserted in the saddlebag;
   wherein the speaker enclosure and the saddlebag, together, perform as an acoustic suspension enclosure for the bass speaker when the speaker enclosure is in the saddlebag; and
   wherein a lid speaker is mounted in the lid of the saddlebag, and wherein the speaker enclosure comprises a second cavity therein for accommodating the lid speaker mounted in the lid such that the lid speaker does not touch the speaker enclosure when the lid is closed.

2. The speaker assembly of claim 1, wherein the speaker enclosure shape complements the interior space of the saddlebag within 2 mm along the front side, back side, front end, back end and bottom.

3. The speaker assembly of claim 1, wherein the speaker enclosure includes an indentation next to the second cavity for providing a hand grip to facilitate removal from and insertion of the speaker enclosure into the saddlebag.

4. The speaker assembly of claim 1, wherein the bass speaker surround in the speaker enclosure is a gasket.

5. The speaker assembly of claim 1, wherein operation of the bass speaker in the first cavity does not interfere with operation of the lid speaker enclosed by the second cavity of the speaker enclosure.

6. A speaker enclosure for an interior cavity of a saddlebag of a motorcycle, the interior cavity defined by a lid, a front end, a back end, a bottom, a first side wall and a second side wall, wherein the saddlebag comprises an opening in the first side wall and a speaker grill mounted over the opening, the speaker enclosure comprising:
   a body having an exterior complementing the interior cavity of the saddlebag, the body in contact with an interior side wall of the first side wall of the saddlebag, the body having a first cavity for mounting a bass speaker within the body, and the body having a bass speaker surround, wherein the bass speaker is aligned with f the opening when the body is inserted in the interior cavity of the saddlebag; and
   wherein the body of the speaker enclosure has a second cavity located in the top of the body for receiving a lid speaker mounted to the lid of the saddlebag.

7. The speaker enclosure of claim 6, wherein the bass speaker in the first cavity does not interfere with sound from the lid speaker that is received in the second cavity.

8. The speaker enclosure of claim 6, wherein the body includes an indentation for providing a hand grip to facilitate hand removal and insertion of the speaker enclosure into the saddlebag.

9. The speaker enclosure of claim 6, wherein the speaker enclosure and the saddlebag, together, are configured to perform as an acoustic suspension enclosure for the bass speaker when the speaker enclosure is in the saddlebag.

10. The speaker enclosure of claim 6, wherein when the lid is closed in sealed engagement with the body of the saddlebag, an interior space within the body of the saddlebag acts as an acoustic suspension enclosure.

11. The speaker enclosure of claim 6, wherein the lid comprises a lid speaker grill mounted thereon and aligned with the lid speaker, wherein the lid speaker is mounted to the inside of the lid.

12. The speaker enclosure of claim 6, wherein the speaker enclosure is a sealed speaker enclosure and wherein the sealed speaker enclosure is configured to be removably inserted in the saddlebag, and wherein when the sealed speaker enclosure is inserted in the saddlebag and the lid is closed, an acoustic suspension enclosure is formed.

13. A speaker enclosure configured to be inserted into a saddlebag, the saddlebag comprising a saddlebag body and a lid, the saddlebag body comprising a saddlebag cavity defined by walls including a front end wall, a back end wall, a first side wall, a second side wall, and a bottom wall, wherein the saddlebag cavity is enclosed by the lid covering the saddlebag body when the lid is closed, and wherein the saddlebag comprises a lid-mounted speaker, the speaker enclosure comprising:
   a bass speaker enclosure body comprising a cavity therein and a body opening;

a bass speaker positioned in the cavity at the body opening, for projecting sound from the bass speaker through the body opening and through one of the walls of the saddlebag; and an indentation for accommodating a portion of the lid-mounted speaker when the lid is closed, wherein the indentation is located in a top portion of the bass speaker enclosure body, for receiving the portion of the lid-mounted speaker when the speaker enclosure is inserted in the saddlebag and when the lid is closed.

14. The speaker enclosure of claim 13, wherein the indentation is conformal to a portion of the lid-mounted speaker that is received in the indentation.

15. The speaker enclosure of claim 13, wherein the bass speaker enclosure body isolates the lid-mounted speaker from sound pressure produced by the bass speaker.

16. The speaker enclosure of claim 13, wherein the speaker enclosure is an acoustically sealed enclosure.

17. The speaker enclosure of claim 13, wherein the bass speaker enclosure body is configured to isolate the lid-mounted speaker from the bass speaker.

18. A speaker enclosure configured to be inserted into a saddlebag, the saddlebag comprising a saddlebag body and a lid, the saddlebag body comprising a saddlebag cavity defined by walls including a front end wall, a back end wall, a first side wall, a second side wall, and a bottom wall, wherein the saddlebag cavity is enclosed by the lid covering the saddlebag body when the lid is closed, and wherein the saddlebag comprises a lid-mounted speaker, the speaker enclosure comprising:

a body having a bass speaker mounted therein, the bass speaker having a surround with a sealing gasket around the bass speaker, wherein the bass speaker is aligned with a speaker grill when the body is inserted in the saddlebag cavity; and wherein the top of the speaker enclosure comprises an indentation therein for providing space for receiving at least a portion of a speaker mounted in the lid of the saddlebag.

19. A motorcycle comprising:

a saddlebag having an interior space defined by a lid, a front side, a back side, a front end, a back end and a bottom, the saddlebag adapted for connection to the motorcycle proximate a rear end of the motorcycle, the saddlebag having an opening, and the saddlebag further comprising a lid-mounted speaker attached to the lid, a speaker grill mounted over the opening in the saddlebag;

a speaker enclosure for inserting into the interior space of the saddlebag, the speaker enclosure comprising:

a bass speaker mounted in a first cavity therein;

a bass speaker surround for directing sound from the bass speaker through the opening and the speaker grill, and a cavity in the speaker enclosure for receiving a portion of the lid-mounted speaker when the speaker enclosure is inserted in the saddlebag and when the lid is closed.

20. The motorcycle of claim 19, wherein the speaker enclosure and the saddlebag, together, perform as an acoustic suspension enclosure for the bass speaker when the speaker enclosure is in the saddlebag.

* * * * *